(12) United States Patent
Ha (10) Patent No.: US 7,171,658 B2
(45) Date of Patent: Jan. 30, 2007

(54) APPARATUS AND METHOD FOR RECORDING FIRMWARE IN COMPUTER SYSTEM

(75) Inventor: Chang Jin Ha, Suwon-si (KR)

(73) Assignee: LG Electronics Inc., Seoul (KR)

( * ) Notice: Subject to any disclaimer, the term of this patent is extended or adjusted under 35 U.S.C. 154(b) by 530 days.

(21) Appl. No.: 10/629,543

(22) Filed: Jul. 30, 2003

(65) Prior Publication Data

US 2004/0040019 A1 Feb. 26, 2004

(30) Foreign Application Priority Data

Aug. 20, 2002 (KR) .................. 10-2002-0049195

(51) Int. Cl.
*G06F 9/44* (2006.01)
*G06F 9/445* (2006.01)
*G06F 15/177* (2006.01)
*G06F 11/00* (2006.01)
*G06F 12/00* (2006.01)

(52) U.S. Cl. .................. 717/168; 717/174; 713/2; 714/100; 711/102; 711/104

(58) Field of Classification Search ........ 717/168–173, 717/124, 174; 711/102–106; 700/81; 713/2
See application file for complete search history.

(56) References Cited

U.S. PATENT DOCUMENTS

| | | | | |
|---|---|---|---|---|
| 4,058,850 A | * | 11/1977 | Sheikh .................. 711/117 |
| 5,134,693 A | * | 7/1992 | Saini .................. 712/244 |
| 5,878,256 A | * | 3/1999 | Bealkowski et al. .......... 713/2 |
| 5,960,445 A | | 9/1999 | Tamori et al. |
| 6,442,067 B1 | * | 8/2002 | Chawla et al. ......... 365/185.11 |
| 6,487,464 B1 | * | 11/2002 | Martinez et al. ............. 700/79 |
| 6,907,602 B2 | * | 6/2005 | Tsai et al. ................... 717/168 |
| 6,981,253 B2 | * | 12/2005 | Asada et al. ................ 717/178 |

* cited by examiner

*Primary Examiner*—Antony Nguyen-Ba
(74) *Attorney, Agent, or Firm*—Fleshner & Kim LLP.

(57) ABSTRACT

An apparatus for recording firmware in a computer system can include a ROM divided into at least two blocks such as a main block and an auxiliary block, for storing system control programs, and a RAM can be provided for temporarily storing the programs stored in the ROM when used to selectively control and update the ROM. A method for recording firmware in a computer system can include dividing an area for storing system control programs into at least two blocks, recording a first program on a first block, recording a second program for selectively deleting, recording and updating the first program on a second block, confirming a control block, loading firmware of the block that will not be controlled, and selectively blanking and updating the block that will be controlled. Although the firmware of the main block is updated or damaged, the system can perform a desired operation (e.g., repair or recovery), without physically replacing the main or damaged block.

19 Claims, 5 Drawing Sheets

APPARATUS AND METHOD FOR RECORDING FIRMWARE IN COMPUTER SYSTEM

BACKGROUND OF THE INVENTION

1. Field of the Invention

The present invention relates to an apparatus and method for recording firmware in a computer system.

2. Background of the Related Art

In general a computer system includes an embedded controller, namely a micro-controller for controlling inputs of a keyboard and a mouse, supplying or intercepting power, and turning on/off the system. When power is applied to the computer system, the micro-controller examines the state of the respective components composing the computer system on the basis of firmware recorded on a ROM, such as a flash memory, and performs a POST (Power On Self Test) process for initialization in order for the computer system to operate. After the micro-controller normal operation of the POST process, an operation system starts to control the system.

During the POST process, a system BIOS (Basic Input Output System) is operated through the communication with the micro-controller. The micro-controller controls LCD, brightness control or volume, battery and thermal information. The system BIOS is stored in the system ROM such as a flash ROM, and a keyboard BIOS is stored in an H8 keyboard controller, which is a micro-controller.

Figure 1:
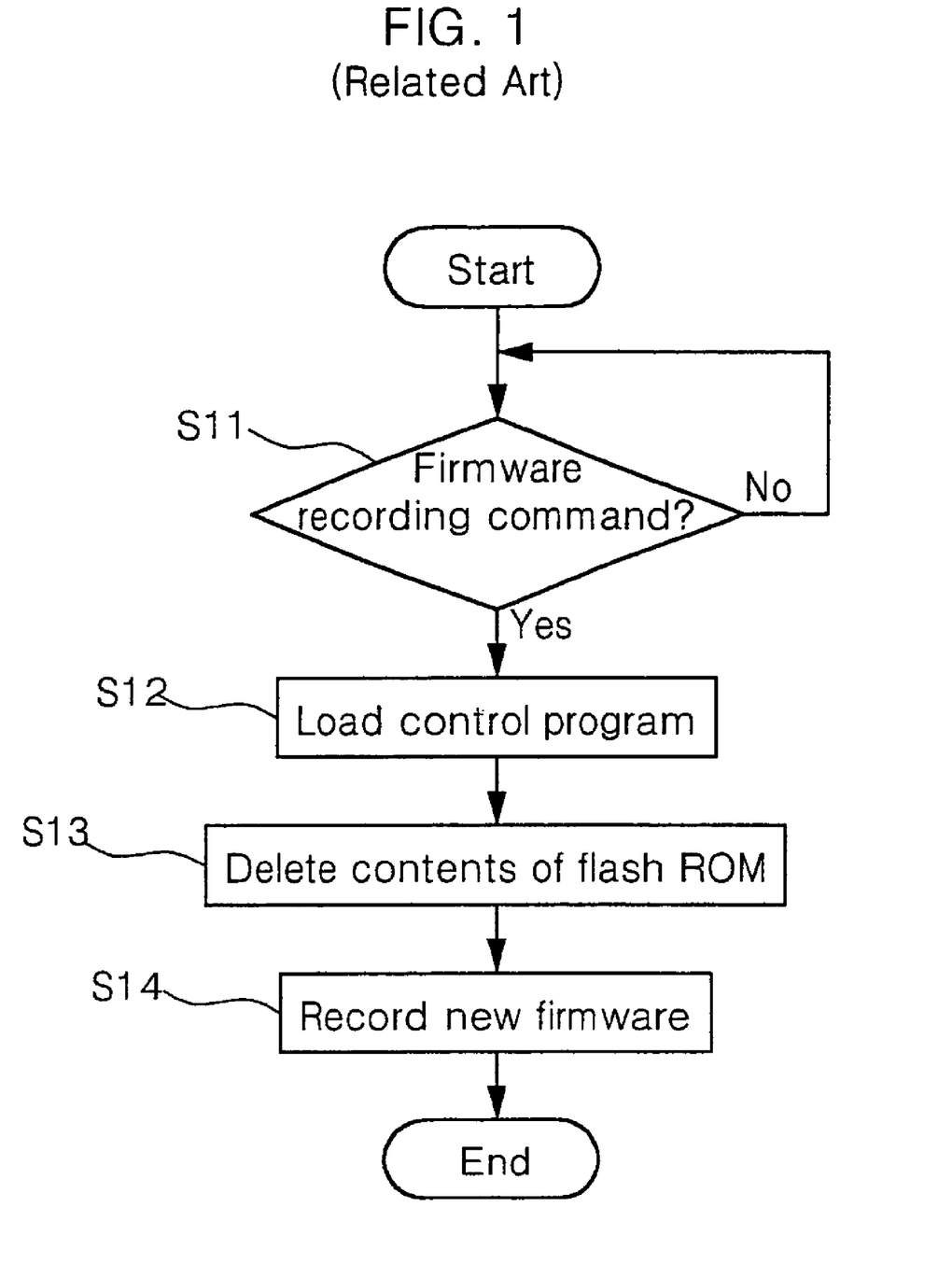
FIG. 1 is a flowchart showing a related art method for recording firmware in a computer system.

The process of recording firmware is generally performed in a system development step. As shown in FIG. 1, after the process starts, a control program for controlling the recording process is loaded to a RAM (step S12) according to a firmware recording command (step S11). If the firmware recording command is not received, the check for the firmware recording command is repeated (step S11). The control program controls deleting the whole contents of the ROM (step S13), and consecutively recording new firmware having initialization information and other functions on the ROM (step S14). Then. The process is completed.

However, if the firmware damaged because of a code bug or update error is recorded on the ROM, the system may stop on a log screen during the POST process of the system BIOS, or may not be responsive to system power-on. To solve the foregoing problems, the micro-controller having the ROM in which the damaged firmware has been recorded on must physically replace the damaged firmware with a normal one. In this case, a main board, connections, devices coupled thereto or an operator may be damaged because of a high difficulty of the corresponding replacement and/or soldering process. Such replacements can also cause waste of money, time and manpower, which results in low productivity and increased costs.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and method for recording firmware in a computer system that can divide a storage device (e.g., ROM) on which firmware is recorded into a main block and an auxiliary block Firmware having entire system functions and firmware for updating the firmware of the main block can be recorded in the main and auxiliary blocks, respectively. The firmware in the auxiliary block for updating the firmware of the main block can be system recovery function routine firmware such as Power on, POST and Flash Routines. Correcting or updating the damaged firmware of the main block can be done using the recovery function routine firmware of the auxiliary block without performing a physical operation for replacing a micro-controller or the like.

Another object of the present invention is to provide an apparatus and method for recording firmware in a computer system that can re-record firmware without physical replacement.

Another object of the present invention is to provide an apparatus and method for recording firmware in a computer system that can perform a POST process even when firmware of a main block is damaged, by recording firmware for performing the POST process on a POST proof block, which can be an auxiliary block.

The foregoing and other objects and advantages can be realized in a whole or in part by providing an apparatus for recording firmware in a computer system that includes a first memory divided into at least two blocks, wherein each of the blocks store system control programs and a second memory that temporarily stores the programs stored in the first memory used to selectively update the first memory.

To further achieve at least the above objects in whole or in part a method for recording firmware in a computer system is provided that includes dividing an area for storing system control programs into at least two blocks, recording a first program on a first block, and recording a second program for selectively updating the first program on a second block.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Preferred embodiments of an apparatus and methods for system recovery or recording firmware in a computer system according to the present invention will now be described. According to preferred embodiments of the present invention, an apparatus and method for system recovery in a computer can include a ROM or the like in which firmware is recorded preferably logically divided into two blocks. In general, a process of dividing the ROM into two blocks can be physically performed, but can also be performed using various methods, for example logically.

One block of the divided firmware can be a main block in which main firmware for performing the whole functions is recorded, and the other block can be an auxiliary block in which system recovery function routine firmware, for example, firmware for performing the POST function and for performing the main firmware, such as Power On, POST and Flash Routines as DOS Routine) is recorded. Thus, the auxiliary block can be a POST-proof block. As used herein, the terminology "firmware" stored using a ROM, can include a type of program such as an application program and thus can be used with the same meaning as the program in the related art and preferred embodiments of the present invention.

When an error occurs in the firmware recorded on the main block or when the firmware is damaged, a micro-controller of the computer system cannot be normally operated. According to preferred embodiments, normal or updated firmware can be recorded on a corresponding block (e.g., damaged firmware) of the ROM according to a firmware update, re-recording command or the like.

Figure 2A:
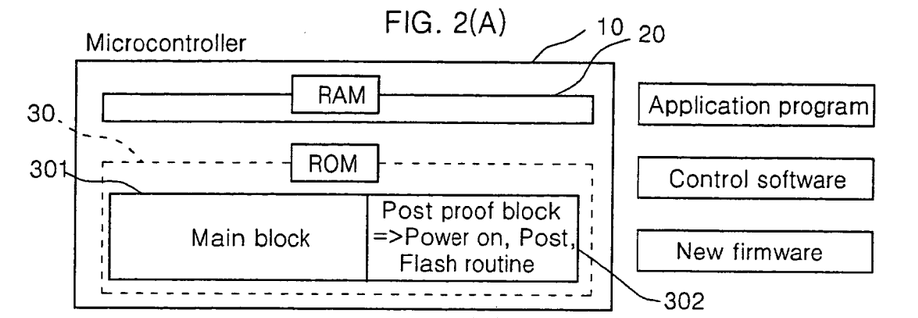
FIGS. 2(A)–2(D) are a block diagrams illustrating a micro-controller in accordance with a preferred embodiment of the present invention.

FIG. 2(A) is a block diagram illustrating a preferred embodiment of a micro-controller in accordance with the present invention. Preferred embodiments of methods for recording firmware in the computer system can be applied to the micro-controller shown in FIG. 2(A) in accordance with the present invention as described hereafter. As shown in FIG. 2(A), a micro-controller 10 is operably coupled to an application program and can include RAM 20, and ROM 30 having main block 301 and an auxiliary block 302. Control software for recording new firmware under the control of an application program, or new firmware that will be recorded on the main block 301 or a POST proof block 302 under the control of the control software is preferably loaded to a RAM 20. The new firmware can be recorded on a ROM 30, which can be logically divided into the main block 301 and the POST proof block 302.

When the main block 301 is damaged, the system is powered on by a block (e.g., power on routines) stored in the auxiliary block (e.g. POST proof block 302), and a system BIOS performs a POST process, and to preferably enter into a DOS mode. A user can perform a flash process in the DOS mode according to an application program to update the damaged block of the main block 301.

As shown in FIGS. 2(A)–2(D), the application program can denote a flash utility program, the control software can denote an update routine, and the new firmware can denote a recovery file for receiving the damaged block. The application program, control software and new firmware are preferably stored in one storing device (for example, floppy disk) in the form of files in the DOS mode, so that the user can recover the system by using the disk or remote communication.

An exemplary process of updating an initialization firmware such as damaged micro-controller 10 by using a previously individually stored recovery function block will now be described using FIGS. 2(A)–2(D). FIG. 2(A) shows the structure of the ROM 30 logically divided into two blocks for respectively storing firmware, and the RAM 20 can record an execute program of the micro-controller 10 or various processing data generated by the execute program. In this example in FIG. 2(A), the damaged firmware has not been updated.

The main block 301 stores data for performing general functions of the micro-controller 10, and the POST proof block 302 stores data necessary for the POST process. Accordingly, when the main block 301 is damaged, it can be recovered by using the POST proof block 302, and when the POST proof block 302 is damaged, it can be recovered by using the main block 301.

For example, when the main block 301 is damaged, the system is powered on by using information (e.g., power-on routines) of the individual block namely the POST proof block 302, and then the system BIOS can perform an initial booting process up to the DOS mode by using the information of the POST proof block 302. Processes of updating the damaged block will be described below.

Figure 2B:
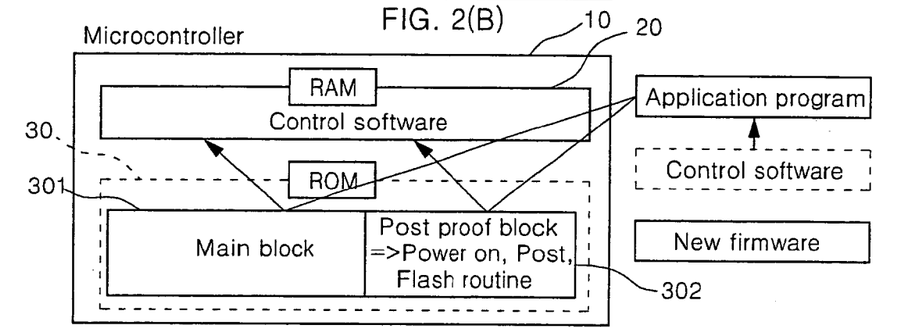

FIG. 2(B) shows a process of loading the update routine (e.g., control software) for recording new firmware to the RAM 20 preferably by the flash utility program, when the user inputs an update command. The flash utility program preferably reads the update routine, and selects a loading path of the update routine according to the state of the firmware recorded on the main block 301 or the POST proof block 302. If the main block 301 has control, the-update routine can be loaded through the firmware recorded on the main block 301, and if the POST proof block 302 has control, the update routine can be loaded through the firmware recorded on the POST proof block 302.

When the micro-controller 10 is reset and driven, control is preferably selected by, for example, combinations of signals inputted to the micro-controller 10 in an initial reset routine. That is, when the previously-set signal combinations are inputted, the firmware of the POST proof block 302 has control. Otherwise, the firmware of the main block 301 has controllability. Thus, the non-failed block of the main block 301 and the POST proof block 302 is set up to have control for loading the update routine to the RAM 20 for updating.

Figure 2C:
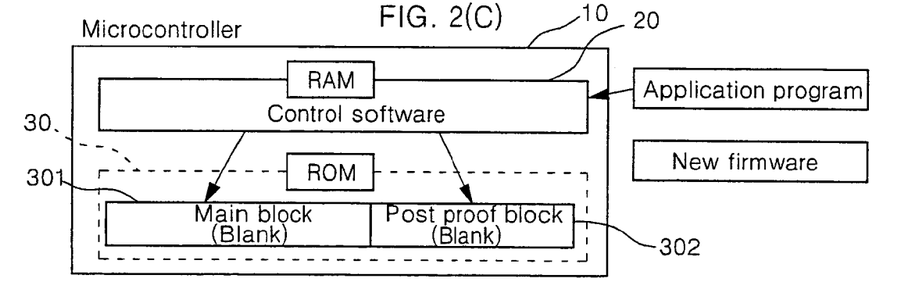

FIG. 2(C) shows a process of deleting the whole contents of a failed object block to which new firmware will be recorded for recovery, when the object block is designated according to the flash utility program after the update routine (e.g., control software) is loaded to the RAM 20. When the main block 301 is designated as the object block preferably by the user according to the flash utility program, the update routine optionally or preferably deletes the contents of the main block 301. When the POST proof block 302 is designated as the object block preferably according to the flash utility program, the update routine deletes the contents of the POST proof block 302.

Figure 2D:
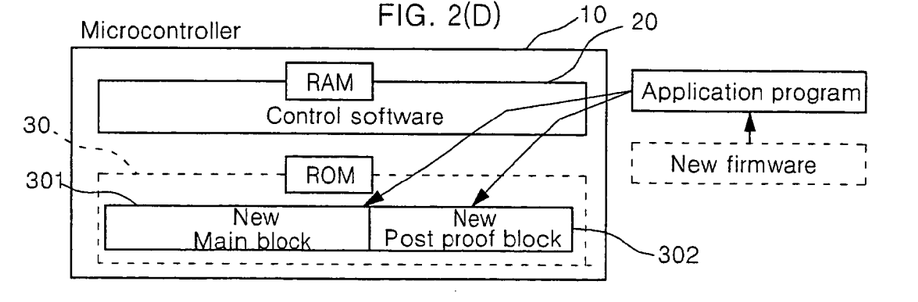

FIG. 2(D) shows a process of recording new firmware provided by the flash utility program on the object block after the contents of the object block have been deleted (e.g., all contents) by the update routine. The update routine then can record the new firmware on the object block Thus, updating the failed object block by the new firmware can complete the recovery process.

When the failed object block is the main block 301, preferably the whole contents of the main block 301 are deleted and updated by new firmware corresponding to the main block 301. When the POST proof block 302 has failed, the whole contents preferably of the POST proof block 302 are deleted and updated by new firmware corresponding to the POST proof block 302 using the main block 301.

Figure 3:
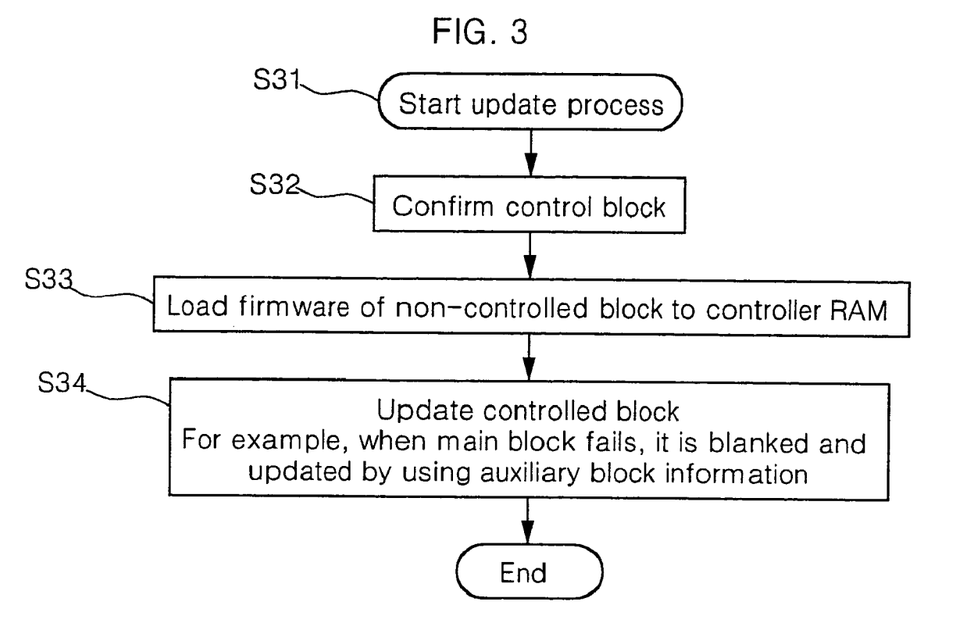
FIG. 3 is a flowchart showing a preferred embodiment of a method for recording the firmware in a computer system in accordance with the present invention.

FIG. 3 is a flowchart showing a preferred embodiment of a method for recording the firmware in the computer system.

The method of FIG. 3 can be applied to and will be described with reference to the microcomputer of FIG. 2.

As shown in FIG. 3, after a process starts the block in which firmware (e.g., a system operating program) has not failed can obtain control and starts the update process (step S31). The control block in which new firmware will be updated can be designated by the user through use of the flash utility program (step S32).

The update routine is loaded to the controller RAM preferably through the firmware of the block that will not be controlled (step S33). Then, the block that will be controlled is preferably updated (step S34), and the process ends.

For example, if the main block is normally operated in the step for confirming the control block, the auxiliary block can be controlled, blanked and updated by the main block On the other hand, when the main block is not normally operated, the main block can be controlled, blanked and updated by using the information of the auxiliary block.

Figure 4:
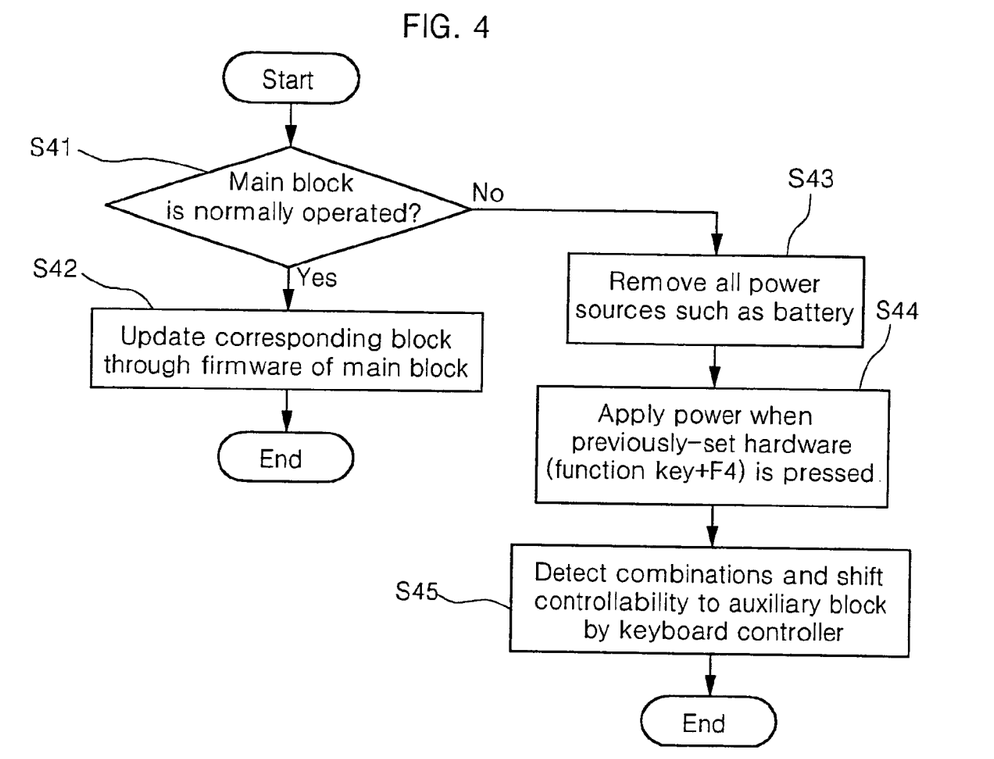
FIG. 4 is a flowchart showing exemplary operations for shifting to a block that will be controlled in the method for recording the firmware in the computer system.

FIG. 4 is a flowchart showing an exemplary process for shifting control to the block that will update firmware when recording firmware in a computer system. As shown in FIG. 4, after a process starts it is determined whether the main block is being normally operated (e.g., confirming the control block, step S32 of FIG. 3) (step S41). When the main block is normally operated, the firmware recorded on the main block preferably containing control functions can be loaded to the RAM, for updating the corresponding block (e.g., auxiliary block) (step S42).

However, if the main block is not normally operated, control is shifted to or obtained by the auxiliary block, and the following process can be performed to shift the control (e.g., control block). All power sources including a battery are preferably removed to reset a microcontroller (step S43). At least one previously-set key (e.g., function key+F4) is pressed, and simultaneously an AC power source is preferably supplied (step S44).

A keyboard controller preferably detects the key pressed state and shifts control to the auxiliary block (step S45). From steps S42 and S45, the process can be completed.

Figure 5:
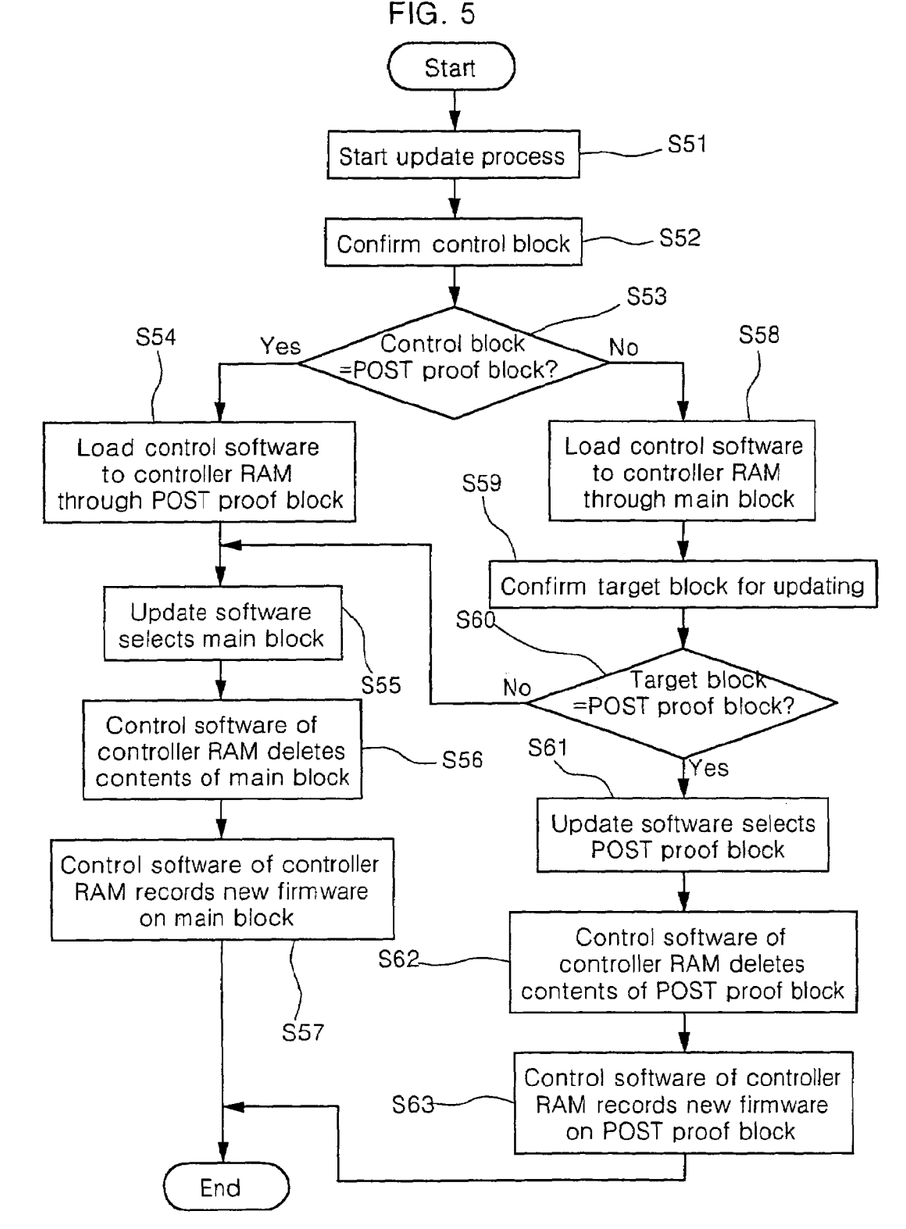
FIG. 5 is a flowchart showing another preferred embodiment of a method for recording the firmware in the computer system in accordance with the present invention.

FIG. 5 is a flowchart showing another preferred embodiment of a method for recording firmware in a computer system in accordance with the present invention. The method of FIG. 5 can be applied to and will be described with reference to the microcomputer of FIG. 2. However, the present invention is not intended to be so limited. After a process starts, when the user inputs the command for re-recording or updating the firmware of the ROM 30 of the micro-controller 10 of FIG. 2 (step S51), preferably the flash utility program, confirms the control block having controllability for updating the current firmware (step S52).

Whether the control block exists in the main block 301 or the POST proof block 302 can then confirmed (step S53). The control block having control can be selected by combinations of hardware input signals in the initial reset routine or the like. If the previously-set signal combinations are inputted, the POST proof block 302 is preferably selected as the control block and if such signal combinations are not inputted, the main block 301 is selected as the control block.

When one of the main block 301 and the POST proof block 302 is damaged, the other block can have control to update the damaged block. For example, when the main block fails on use, all power sources such as a battery are removed, and prescribed hardware can be determined. For example, when a key combination (e.g., function key+F4) is entered, AC power is applied, and a keyboard (e.g., H8 K/B) controller can detect the key pressed state and shift control to the auxiliary block Accordingly, the functions set up in the auxiliary block, such as Power On, POST and Flash routines are performed, so that the system preferably enters into the DOS mode. As a result, the user can recover the system in the DOS mode or the like.

The control block having control is preferably selected to update the main block when the auxiliary block has control. It prevents the main block and the auxiliary block from failing at the same time, and at least can maintain the auxiliary block in the normal state. Therefore, when the main block 301 has control, the contents of the main block 301 and the POST proof block 302 preferably can be re-recorded, and when the POST proof block 302 has control, the contents of the main block 301 can be re-recorded.

When it is determined in step S53 that the control block exists in the POST proof block 302, the update routine for updating the firmware is loaded to the RAM 20 through the POST proof block 302 (step S54). Thereafter, when the main block 301 is designated as the block in which the firmware will be updated in by the flash utility program (step S55), the update routine loaded to the RAM 20 deletes contents (e.g., all contents) recorded on the main block 301 (step S56) and records the new firmware on the corresponding block (e.g., maim block 301) of the ROM 30 according to the flash utility program (step S57). Accordingly, when the main block 301 has failed, it can be updated by software, instead of replacing the whole micro-controller 10 or ROM containing the damaged firmware.

On the other hand, when the control block is determined to be the main block 301 (step S53), the update routine is loaded to the RAM 20 through the main block 301 (step S58). Thereafter, the loaded update routine preferably confirms a target block that will be updated (step S59), and decides whether the main block 301 or the POST proof block 302 is the target block (step S60).

When the main block 301 is determined to be the target block (step S60), the update routine loaded to the RAM 20 and the process can jump to step S55 to perform the update recording process. If the POST proof block 302 is the target block, the update routine preferably designates the POST proof block 302 as the block in which the firmware will be updated by the flash utility program (step S61). Thereafter, the update routine can delete the whole contents of the POST proof block 302 (step S62), and record new firmware on the POST proof block 302 (step S63).

As described above, the information of the main block 301 and the POST proof block 302 can be updated by new firmware. Further, even if one of the two blocks is damaged, it can be recovered by new firmware. It is thus possible to update the damaged block with software, instead of replacing the micro-controller.

In addition, a code block for successively performing the POST process can be individually formed in the firmware of the micro-controller like a keyboard/embedded controller of the PC (portable computer) system, so that the firmware can be updated in any case without performing the physical operation for replacing the micro-controller. Preferably, when the firmware of the main block 301 is damaged, its embedded controller cannot detect when the user presses a power button. However, the system can be powered on by using the Power-On routine of the POST proof block 302, and thus the damaged firmware can be updated.

A prescribed or minimum-sized firmware block for successively performing the POST process can be formed and prevented from being deleted and recorded in the update process. Accordingly, the firmware for successively performing the POST process can always exist in the micro-controller (e.g., for future use).

As described above, preferred embodiments of a method and apparatus for firmware recovery have various advantages. Preferred embodiments can update damaged firmware during the production (e.g., manufacturing) without physical operations, reduces time consumption for handling errors during the development, and can directly cope with update errors in a user environment. Further, preferred embodiments for recording the firmware in the computer system can logically divide the ROM in which firmware is recorded into a main block and an auxiliary block. Preferably, the firmware having the whole functions are recorded on the main block and the firmware for updating the firmware of the main block are recorded on the auxiliary block to correct or update the firmware without performing the physical operation for replacing the micro-controller. Moreover, firmware m the computer system can perform the POST process even when the firmware of the main block is damaged, by recording the firmware for performing the POST process on the auxiliary block In addition, errors generated during the production can be handled without replacing an IC, which remarkably cuts down labor and production cost and reduces time consumption for performing a soldering process during the development.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for recording firmware in a computer system, comprising:
    a first memory divided into at least two blocks that store different system programs, a second block of said at least two blocks further storing a recovery program for performing a firmware recovery operation; and
    a second memory that temporarily stores the recovery program when received from the second block when a first block of said at least two blocks has a failure, the recovery program performing said operation to selectively update firmware in the first block of the first memory,
    wherein the first memory is a ROM that includes a main block which corresponds to the first block and an auxiliary block which corresponds to the second block, the main block storing the firmware for operating the system and the auxiliary block comprising at least one system recovery function routine firmware, and wherein the firmware stored in the auxiliary block is at least one of a Power On Self Test (POST), a Power On or a Flash routine for recovering the system.

2. The apparatus according to claim 1, wherein the second memory is a RAM and is configured to selectively store data to blank and update the first memory when an object block to which new firmware will be recorded is designated by an application program.

3. The apparatus according to claim 1, wherein the recovery program performs the firmware update operation in response to a user input signal.

4. The apparatus according to claim 1, wherein the first and second blocks store the recovery program.

5. An apparatus for recording firmware in a portable computer system, comprising:
    a micro-controller; and
    a first memory coupled to the micro-controller that is divided into first and second blocks, wherein the first and second blocks store different system programs and wherein the second block further stores a recovery program for performing a firmware recovery operation, and
    wherein the first block stores a program or data for performing general system controller functions and the second block stores a program or data for performing at least one of a Power On Self Test (POST), Power On, or flash routines for the system.

6. The apparatus according to claim 5, wherein the first memory is a ROM that is divided into the first block and the second block, wherein the first block of the ROM stores firmware for operating the system, and wherein the second block of the ROM comprises at least one system recovery function routine firmware.

7. A method for recording firmware in a computer system, comprising:
    dividing an area for storing different system programs into at least two blocks;
    recording a first program on a first block; and
    recording a second program for selectively updating the first program on a second block, said dividing including:
    logically dividing a ROM where firmware is recorded into a main block and an auxiliary block, said area including the ROM, wherein main firmware is recorded on the main block and auxiliary firmware for selectively deleting, recording and updating the main firmware is recorded on the auxiliary block, and
    wherein the main block stores a program or data for performing general system controller functions and the auxiliary block stores a program or data for performing at least one of a Power On Self Test (POST), Power On, or flash routines for the system.

8. The method according to claim 7, wherein the ROM stores the system programs.

9. The method according to claim 7, further comprising:
    determining a control block;
    loading firmware of the control block to a controller RAM; and
    selectively blanking and updating a controlled block.

10. The method according to claim 9, wherein the controlled block is blanked before being updated.

11. The method according to claim 9, wherein when the main block is normally operated in the determining the control block, at least one of the main block and the auxiliary block is updated through the main block, and wherein, when the main block is not normally operated in the determining the control block, the auxiliary block is operated to update the main block.

12. The method according to claim 11, wherein the determining a control block is performed by user operations.

13. The method according to claim 12, wherein the determining a control block comprises shifting a control function to the auxiliary block including:
    removing all power sources to the computer system;
    applying an AC power source when at least one previously-set key is pressed; and
    detecting the key pressed state and shifting the control block to the auxiliary block by a keyboard controller.

14. The method according to claim 13, wherein, when the auxiliary block is the control block, an abnormal program of the main block is updated.

15. The method according to claim 14, wherein a firmware system recovery function routine recorded on the auxiliary block is used to update firmware of the main block.

16. The method according to claim 11, wherein the loading firmware of the control block is performed by main firmware or auxiliary firmware in the control block.

17. The method according to claim 16, wherein the control block is selected by combinations of signals inputted to a micro-controller having the ROM in an initial reset routine.

18. A method for recording firmware in a computer system, comprising:

logically dividing a ROM into a main block and an auxiliary block that store different programs;

recording main firmware on the main block;

recording auxiliary firmware for selectively deleting and recording the main firmware on the auxiliary block;

confirming an update command for the firmware recorded on the ROM;

loading a control program for executing the update command to a RAM;

confirming one of the main block and the auxiliary block as an object block to which new firmware will be recorded; and deleting the contents of the object block and recording the new firmware thereon, wherein the main block stores a program or data for performing general system controller functions and the auxiliary block stores a program or data for performing at least one of a Power On Self Test (POST), Power On, or flash routines for the system.

19. The method of claim 18, wherein the new firmware was recorded from the other of the main block.

* * * * *